(12) United States Patent
Huang et al.

(10) Patent No.: US 8,405,755 B2
(45) Date of Patent: Mar. 26, 2013

(54) PHOTOGRAPHING OPTICAL LENS ASSEMBLY

(75) Inventors: Hsin-Hsuan Huang, Taichung (TW); Tsung-Han Tsai, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 269 days.

(21) Appl. No.: 13/033,603

(22) Filed: Feb. 24, 2011

(65) Prior Publication Data

US 2012/0099014 A1 Apr. 26, 2012

(30) Foreign Application Priority Data

Oct. 20, 2010 (TW) .............................. 99135777 A

(51) Int. Cl.
*H04N 5/225* (2006.01)
*G02B 9/34* (2006.01)

(52) U.S. Cl. ...................... 348/335; 359/773; 359/774

(58) Field of Classification Search .................. 348/335; 359/676, 687, 388, 754, 771, 773, 774
See application file for complete search history.

(56) References Cited

U.S. PATENT DOCUMENTS

| 7,446,954 | B2 * | 11/2008 | Sun ............................... 359/773 |
| 7,961,406 | B2 * | 6/2011 | Tang et al. ..................... 359/715 |
| 2009/0207506 | A1 * | 8/2009 | Tang et al. ..................... 359/773 |

* cited by examiner

*Primary Examiner* — James Hannett
(74) *Attorney, Agent, or Firm* — CKC & Partners Co., Ltd.

(57) ABSTRACT

A photographing optical lens assembly includes, in order from an object side to an image side, a first lens element with positive refractive power having a convex object-side surface, a second lens element with negative refractive power having a concave object-side surface and a convex image-side surface, a third lens element with positive refractive power having a convex object-side surface and a convex image-side surface, and a fourth lens element having a convex object-side surface and a concave image-side surface with both surfaces thereof being aspheric.

22 Claims, 12 Drawing Sheets

PHOTOGRAPHING OPTICAL LENS ASSEMBLY

RELATED APPLICATIONS

The application claims priority to Taiwan Application Serial Number 099135777, filed Oct. 20, 2010, which is herein incorporated by reference.

BACKGROUND

1. Technical Field

The present invention relates to a photographing optical lens assembly. More particularly, the present invention relates to a compact photographing optical lens assembly applicable to electronic products.

2. Description of Related Art

In recent years, with the popularity of mobile products with camera functionalities, the demand for compact photographing lenses is increasing, and the sensor of a conventional photographing camera is none other than CCD (Charge Coupled Device) or CMOS (Complementary Metal-Oxide Semiconductor Sensor). Furthermore, as advanced semiconductor manufacturing technology has allowed the pixel size of sensors to be reduced and compact photographing lenses have gradually evolved toward higher megapixels, there is an increasing demand for compact photographing lenses featuring better image quality.

A conventional compact photographing lens assembly on a portable electronic product mainly adopts a three-element lens structure, as disclosed in U.S. Pat. No. 7,145,736, wherein a lens system thereof has a first lens element with positive refractive power, a second lens element with negative refractive power and a third lens element with positive refractive power arranged in order from an object-side to an image-side. However, due to the advancement of the manufacturing technology and the demand for compact camera units on various mobile products, the three-element lens structure cannot produce high quality images when the total optical track length decreases. Additionally, the three-element lens structure cannot satisfy the requirements of the higher-level camera modules.

Furthermore, another conventional compact photographing lens assembly provides a four-element lens structure, as disclosed in U.S. Pat. No. 7,365,920. The first lens element and the second lens element of the four-element lens structure are two glass lens elements with spherical surfaces which are attached to each other to form a doublet lens for the purpose of eliminating the chromatic aberration. However, this lens structure requires a longer total optical track length due to lower degrees of freedom in setting system parameters by allocating too many spherical lenses, and the manufacturing process for forming the glass doublet lenses can be difficult.

Therefore, a need exists in the art for providing a photographing lens assembly that features better image quality, maintains a moderate total track length, and is easy to manufacture.

SUMMARY

The present invention provides a photographing optical lens assembly including, in order from an object side to an image side: a first lens element, a second lens element, a third lens element and a fourth lens element. The first lens element with positive refractive power has a convex object-side surface. The second lens element with negative refractive power has a concave object-side surface and a convex image-side surface. The third lens element with positive refractive power has a convex object-side surface and a convex image-side surface. The fourth lens element has a convex object-side surface and a concave image-side surface, wherein the object-side surface and the image-side surface of the fourth lens element are aspheric. A radius of curvature of the object-side surface of the second lens element is R3; a radius of curvature of the image-side surface of the second lens element is R4; a radius of curvature of the object-side surface of the first lens element is R1; and a radius of curvature of the image-side surface of the first lens element is R2. The photographing optical lens assembly further includes an aperture stop, wherein a distance on the optical axis between the aperture stop and the image plane is SL, a distance on the optical axis between the object-side surface of the first lens element and the image plane is TTL. R1, R2, R3, R4, SL and TTL satisfy the following relationships:

$$-5.0 < (R3+R4)/(R3-R4) < -2.0;$$

$$|R1/R2| < 0.5; \text{ and}$$

$$0.80 < SL/TTL < 1.20.$$

According to another aspect of the present invention, a photographing optical lens assembly includes, in order from an object side to an image side: a first lens element, a second lens element, a third lens element and a fourth lens element. The first lens element with positive refractive power has a convex object-side surface. The second lens element with negative refractive power has a concave object-side surface. The third lens element with positive refractive power has a convex object-side surface and a convex image-side surface. The fourth lens element has a concave image-side surface, and has at least one inflection point on at least one of an object-side surface and the image-side surface thereof. A radius of curvature of the object-side surface of the third lens element is R5, a radius of curvature of the image-side surface of the third lens element is R6, a distance on the optical axis between the first lens element and the second lens element is T12, a focal length of the photographing optical lens assembly is f, and a thickness on the optical axis of the third lens element is CT3. The photographing optical lens assembly further includes an aperture stop, wherein a distance on the optical axis between the aperture stop and the image plane is SL, and a distance on the optical axis between the object-side surface of the first lens element and the image plane is TTL. R5, R6, T12, f, CT3, SL and TTL satisfy the following relationships:

$$-2.7 < R5/R6 < -0.9;$$

$$0.13 < T12/f < 0.27;$$

$$0.07 < CT3/f < 0.28; \text{ and}$$

$$0.92 < SL/TTL < 1.10.$$

By the aforementioned aspects, total track length and sensitivity of the photographing optical lens assembly can be effectively reduced while retaining high image quality.

DETAILED DESCRIPTION

Figure 1:
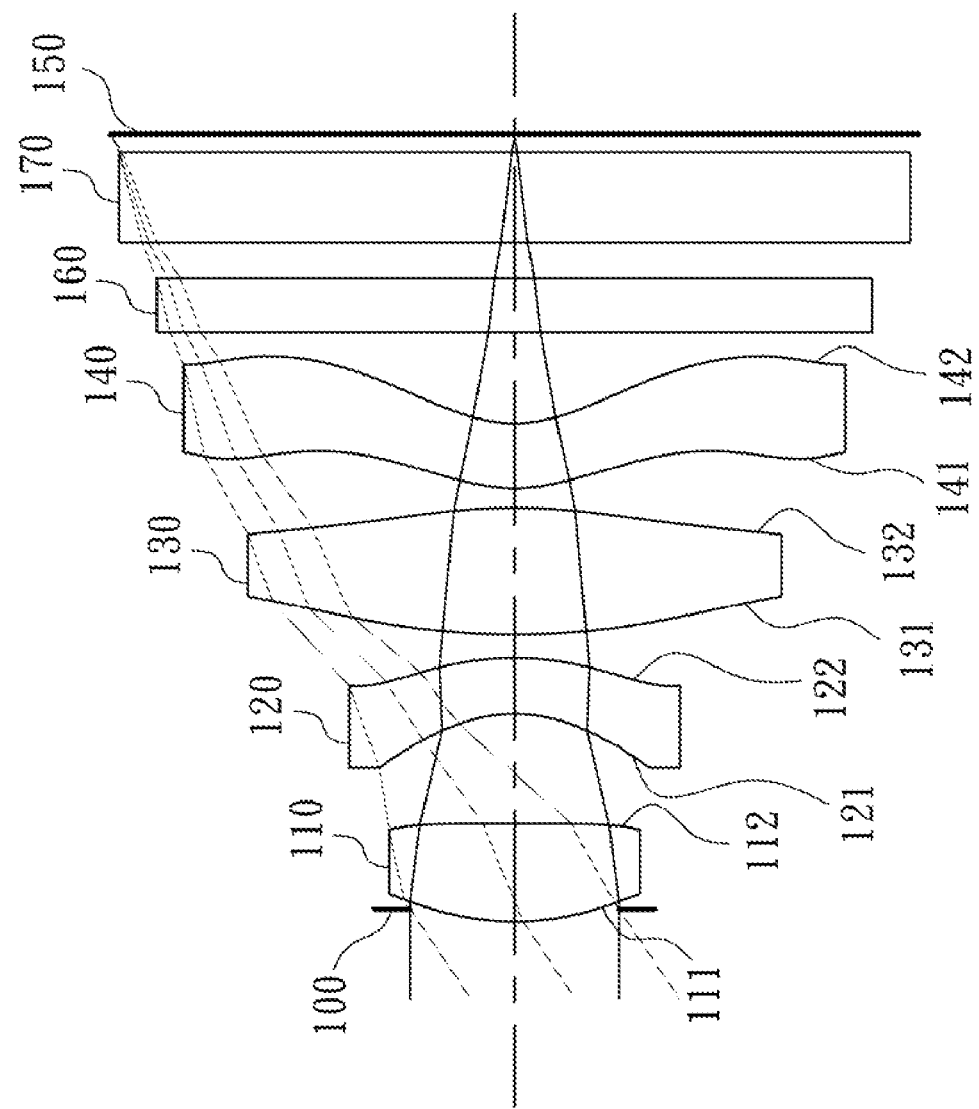
FIG. 1 is a schematic view of a photographing optical lens assembly according to the first embodiment.

A photographing optical lens assembly includes, in order from an object side to an image side: a first lens element, a second lens element, a third lens element and a fourth lens element. The photographing optical lens assembly further includes an image sensing unit located on the image plane.

The first lens element with positive refractive power provides partial refractive power for reducing the total track length of the photographing optical lens assembly. The first lens element can have a convex object-side surface and a convex image-side surface or a convex object-side surface and a concave image-side surface. When the first lens element has a convex object-side surface and a convex image-side surface, the refractive power thereof can be effectively enhanced, thus allowing further reduction of the total track length of the photographing optical lens assembly. When the first lens element has a convex object-side surface and a concave image-side surface, the astigmatism of the photographing optical lens assembly can be corrected.

The second lens element with negative refractive power can correct the aberration generated from the first lens element and the chromatic aberration within the optical system. The second lens element can have a concave object-side surface and a to concave image-side surface or a concave object-side surface and a convex image-side surface. When the second lens element has a concave object-side surface and a concave image-side surface, the Petzval Sum can be corrected, and the back focal length of the photographing optical lens assembly can be increased for possible additions of other components. When the second lens element has a concave object-side surface and a convex image-side surface, the astigmatism of the photographing optical lens assembly can be corrected while retaining high image quality.

The third lens element with positive refractive power can reduce the sensitivity of the photographing optical lens assembly by providing a partial distribution of the system refractive power. The third lens element has a convex object-side surface and a convex image-side surface, so that the refractive power can be further enhanced. Moreover, the total track length of the photographing optical lens assembly can be effectively reduced.

The fourth lens element has negative refractive power, so that the principal point of the photographing optical lens assembly can be positioned away from the image plane, and the total track length of the photographing optical lens assembly can be reduced, so as to maintain the compact size of the photographing optical lens assembly. The fourth lens element has at least one inflection point formed on at least one of the object-side surface and image-side surface thereof. The fourth lens element has a convex object-side surface and a concave image-side surface, so that the astigmatism and the high order aberration of the photographing optical lens assembly can be corrected.

A radius of curvature of the object-side surface of the second lens element is R3, a radius of curvature of the image-side surface of the second lens element is R4, and they satisfy the following relationship:

$$-5.0<(R3+R4)/(R3-R4)<-2.0.$$

Therefore, the second lens element can correct the astigmatism of the first lens element. And the refractive power of the second lens element can reduce the sensitivity of the photographing optical lens assembly.

R3 and R4 can further satisfy the following relationship:

$$-3.5<(R3+R4)/(R3-R4)<-2.3.$$

A radius of curvature of the object-side surface of the first lens element is R1, a radius of curvature of the image-side surface of the first lens element is R2, and they satisfy the following relationship:

$$|R1/R2|<0.5.$$

Therefore, the spherical aberration of the photographing optical lens assembly can be corrected.

R1 and R2 can further satisfy the following relationship:

$$|R1/R2|<0.2.$$

The photographing optical lens assembly includes an aperture stop. The distance on the optical axis between the aperture stop and the image plane is SL, a distance on the optical axis between the object-side surface of the first lens element and the image plane is TTL, and they satisfy the following relationship:

$$0.80<SL/TTL<1.20.$$

When the SL/TTL<0.80, the angle of incidence on the image sensing unit would be too large, which will cause poor photographic performance of the image sensing unit as well as too much chromatic aberration within the photographing optical lens assembly. When the SL/TTL>1.20, the total track length of the photographing optical lens assembly would be too long. Therefore, when SL/TTL satisfies the above relationship, the photographing optical lens assembly has the telecentric characteristic, to and a desirable total track length of the photographing optical lens assembly can be maintained.

SL and TTL can further satisfy the following relationship:

$$0.92<SL/TTL<1.10.$$

A distance on the optical axis between the first lens element and the second lens element is T12, a focal length of the photographing optical lens assembly is f, and they satisfy the following relationship:

$$0.13<T12/f<0.27.$$

When the above relation is satisfied, the total track length of the photographing optical lens assembly can be reduced.

A radius of curvature of the object-side surface of the third lens element is R5, a radius of curvature of the image-side surface of the third lens element is R6, and they satisfy the following relationship:

$-2.7 < R5/R6 < -0.9.$

When the above relation is satisfied, the astigmatism of the photographing optical lens assembly can be favorably corrected.

A radius of curvature of the object-side surface of the fourth lens element is R7, a radius of curvature of the image-side surface of the fourth lens element is R8, and they satisfy the following relationship:

$3.0 < (R7+R8)/(R7-R8) < 25.0.$

When the above relation is satisfied, the higher order aberration of the photographing optical lens assembly can be corrected.

The focal length of the photographing optical lens assembly is f, a focal length of the fourth lens element is f4, and they satisfy the following relationship:

$-0.7 < f/f4 < 0.0.$

When the above relation is satisfied, the principal point of the photographing optical lens assembly can be positioned away from the image plane, and the total track length of the photographing optical lens assembly can be reduced, so as to maintain the compact size of the photographing optical lens assembly.

A thickness on the optical axis of the third lens element is CT3, the focal length of the photographing optical lens assembly is f, and they satisfy the following relationship:

$0.07 < CT3/f < 0.28.$

By the above arrangement, the manufacturing of the lenses will be easier and the total track length can be reduced.

The focal length of the photographing optical lens assembly is f, a focal length of the second lens element is f2, and they satisfy the following relationship:

$-1.3 < f/f2 < -0.9.$

When the above relation is satisfied, the aberration of the photographing optical lens assembly can be favorably corrected.

A half of a diagonal length of an effective pixel area of the image sensing unit is ImgH, the distance on the optical axis between the object-side surface of the first lens element and the image plane is TTL, and they satisfy the following relationship:

$TTL/ImgH < 1.95.$

When the above relation is satisfied, the total track length of the photographing optical lens assembly can be reduced for applications on lightweight and portable electronic products.

According to the above description of the present invention, the following 1st-6th specific embodiments are provided for further explanation.

Figure 2:
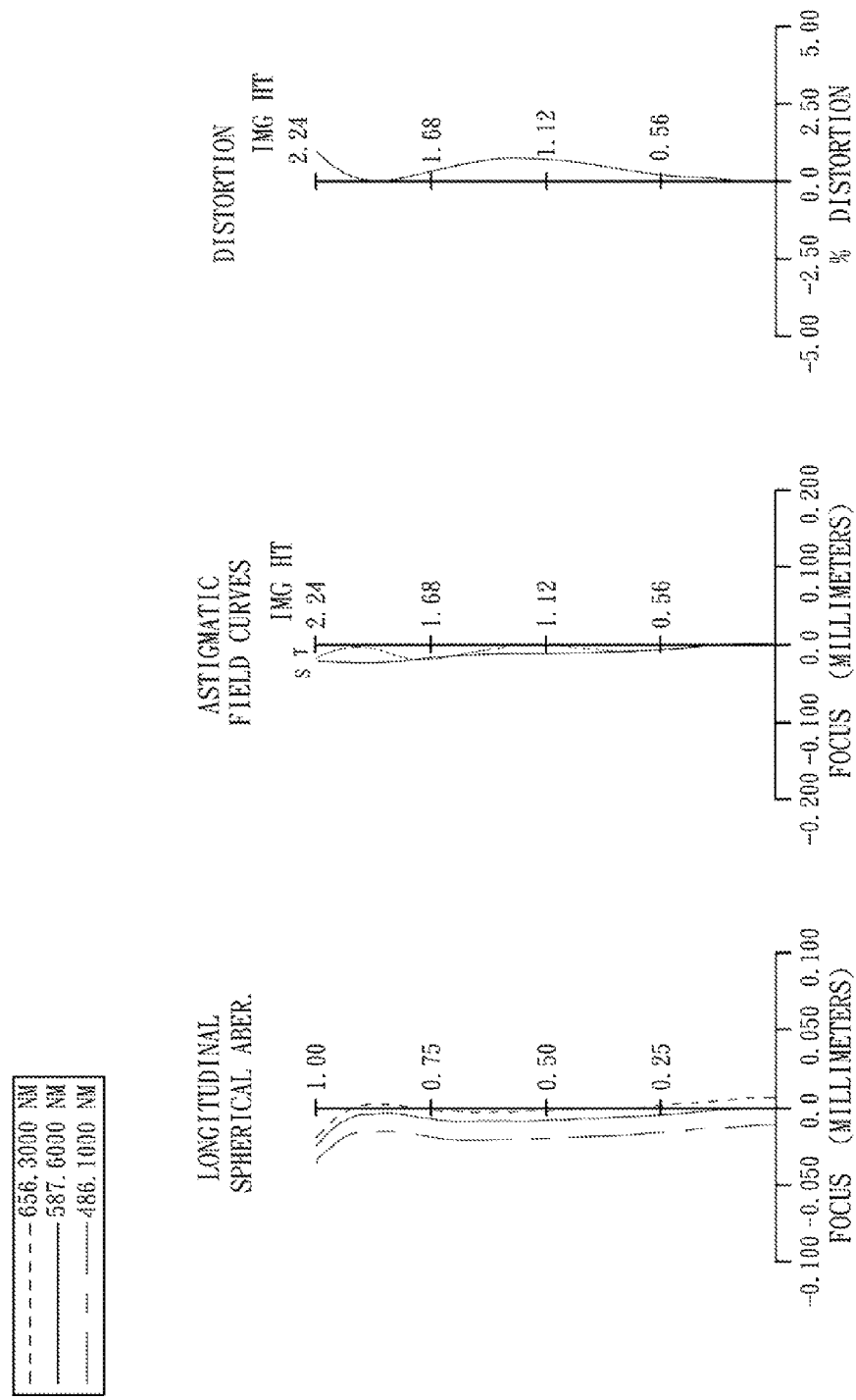
FIG. 2 shows spherical aberration curves, astigmatic field curves and distortion curve of the photographing optical lens assembly according to the first embodiment.

FIG. 1 is a schematic view of a photographing optical lens assembly according to the first embodiment. FIG. 2 shows spherical aberration curves, astigmatic field curves and distortion curve of the photographing optical lens assembly according to the first embodiment. In FIG. 1, the photographing optical lens assembly includes, in order from an object side to an image side: an aperture stop 100, the first lens element 110, the second lens element 120, the third lens element 130, the fourth lens element 140, an IR (infrared) cut filter 160, a cover glass 170 and an image plane 150.

The first lens element 110 is made of plastic material. The first lens element 110 with positive refractive power has a convex object-side surface 111 and a concave image-side surface 112. The object-side surface 111 and the image-side surface 112 of the first lens element 110 are aspheric.

The second lens element 120 is made of plastic material. The second lens element 120 with negative refractive power has a concave object-side surface 121 and a convex image-side surface 122. The object-side surface 121 and the image-side surface 122 of the second lens element 120 are aspheric.

The third lens element 130 is made of plastic material. The third lens element 130 with positive refractive power has a convex object-side surface 131 and a convex image-side surface 132. The object-side surface 131 and the image-side surface 132 of the third lens element 130 are aspheric.

The fourth lens element 140 is made of plastic material. The fourth lens element 140 with negative refractive power has a convex object-side surface 141 and a concave image-side surface 142. The fourth lens element 140 has inflection points formed on both the object-side surface 141 and the image-side surface 142 thereof. The object-side surface 141 and the image-side surface 142 of the fourth lens element 140 are aspheric.

The IR cut filter 160 and the cover glass 170 are located behind the fourth lens element 140, which have no influence on the focal length of the photographing optical lens assembly.

The equation of the aspheric surface profiles of the above lens elements of the first embodiment is expressed as follows:

$$X(Y) = (Y^2/R)/(1 + \operatorname{sqrt}(1 - (1+k) \times (Y/R)^2)) + \sum_i (Ai) \times (Y^i)$$

wherein:

X: the height of a point on the aspheric surface spaced at a distance Y from the optical axis relative to the tangential plane at the aspheric surface vertex;

Y: the distance from the point on the curve of the aspheric surface to the optical axis;

k: the conic coefficient; and

Ai: the i-th order of the aspheric coefficient.

In the photographing optical lens assembly according to the first embodiment, f is a focal length of the photographing optical lens assembly, and Fno is an f-number of the photographing optical lens assembly, HFOV is half of the maximal field of view, and they satisfy the following relationships:

$f=3.30$ mm;

Fno=2.85; and

HFOV=34.0 degrees.

In the photographing optical lens assembly according to the first embodiment, V1 is an Abbe number of the first lens element 110, V2 is an Abbe number of the to second lens element 120, and they satisfy the following relationship:

$V1-V2=32.4.$

In the photographing optical lens assembly according to the first embodiment, CT3 is a thickness on the optical axis of the third lens element 130, f is the focal length of the photographing optical lens assembly, and they satisfy the following relationship:

$CT3/f=0.22.$

In the photographing optical lens assembly according to the first embodiment, T12 is a distance on the optical axis between the first lens element 110 and the second lens element 120, f is the focal length of the photographing optical lens assembly, and they satisfy the following relationship:

$T12/f=0.19.$

In the photographing optical lens assembly according to the first embodiment, R1 is a radius of curvature of the object-side surface 111 of the first lens element 110, R2 is a radius of curvature of the image-side surface 112 of the first lens element 110, R3 is a radius of curvature of the object-side surface 121 of the second lens element 120, R4 is a radius of curvature of the image-side surface 122 of the second lens element 120, R5 is a radius of curvature of the object-side surface 131 of the third lens element 130, R6 is a radius of curvature of the image-side surface 132 of the third lens element 130, R7 is a radius of curvature of the object-side surface 141 of the fourth lens element 140, R8 is a radius of curvature of the image-side surface 142 of the fourth lens element 140, and they satisfy the following relationships:

$|R1/R2|=0.03;$ $R5/R6=-1.20;$ $(R3+R4)/(R3-R4)=-3.01;$ and $(R7+R8)/(R7-R8)=7.06.$ In the photographing optical lens assembly according to the first embodiment, f2 is a focal length of the second lens element 120, f4 is a focal length of the fourth lens element 140, f is the focal length of the photographing optical lens assembly, and they satisfy the following relationships:

$f/f2=-1.02;$ and $f/f4=-0.29.$

In the photographing optical lens assembly according to the first embodiment, SL is a distance on the optical axis between the aperture stop 100 and the image plane 150, TTL is a distance on the optical axis between the object-side surface 111 of the first lens element 110 and the image plane 150, and they satisfy the following relationship:

$SL/TTL=0.98.$

In the photographing optical lens assembly according to the first embodiment, the photographing optical lens assembly further includes an image sensing unit located on the image plane 150, wherein a half of a diagonal length of an effective pixel area of the image sensing unit is ImgH. TTL is the distance on the optical axis between the object-side surface 111 of the first lens element 110 and the image plane 150, and they satisfy the following relationship:

$TTL/ImgH=1.83.$

The detailed optical data of the first embodiment is shown in Table 1, and the aspheric surface data is shown in Table 2 as follows.

TABLE 1

1st Embodiment
f = 3.30 mm, Fno = 2.85, HFOV = 34.0 deg.

| Surface # |  | Curvature Radius | Thickness | Material | Index | Abbe # | Focal length |
|---|---|---|---|---|---|---|---|
| 0 | Object | Plano | Infinity |  |  |  |  |
| 1 | Ape. Stop | Plano | −0.070 |  |  |  |  |
| 2 | Lens 1 | 1.50811 (ASP) | 0.542 | Plastic | 1.530 | 55.8 | 2.91 |
| 3 |  | 56.87020 (ASP) | 0.613 |  |  |  |  |
| 4 | Lens 2 | −0.88083 (ASP) | 0.307 | Plastic | 1.632 | 23.4 | −3.23 |
| 5 |  | −1.75896 (ASP) | 0.130 |  |  |  |  |
| 6 | Lens 3 | 3.93640 (ASP) | 0.703 | Plastic | 1.530 | 55.8 | 3.49 |
| 7 |  | −3.27910 (ASP) | 0.110 |  |  |  |  |
| 8 | Lens 4 | 0.95153 (ASP) | 0.359 | Plastic | 1.530 | 55.8 | −11.50 |
| 9 |  | 0.71543 (ASP) | 0.505 |  |  |  |  |
| 10 | IR-filter | Plano | 0.300 | Glass | 1.517 | 64.2 | — |
| 11 |  | Plano | 0.200 |  |  |  |  |
| 12 | Cover-glass | Plano | 0.500 | Glass | 1.517 | 64.2 | — |
| 13 |  | Plano | 0.099 |  |  |  |  |
| 14 | Image | Plano | — |  |  |  |  |

The reference wavelength (d-line) is 587.6 nm.

TABLE 2

Aspheric Coefficients

| | Surface # | | | |
|---|---|---|---|---|
| | 2 | 3 | 4 | 5 |
| k = | −5.98526E−01 | 0.00000E+00 | −5.21932E+00 | 0.00000E+00 |
| A4 = | −3.52858E−03 | −9.96427E−02 | −8.33369E−01 | −1.81192E−01 |
| A6 = | −1.10709E−01 | 2.21584E−02 | 2.11690E+00 | 8.85440E−01 |
| A8 = | 9.52361E−01 | −4.72746E−01 | −3.75770E+00 | −1.41316E+00 |
| A10 = | −4.29922E+00 | 5.96972E−01 | 5.26853E+00 | 1.82793E+00 |
| A12 = | 5.27862E+00 | −1.30003E+00 | −6.07557E+00 | −1.45351E+00 |
| A14 = | 5.84685E+00 | 3.11793E+00 | 5.19865E+00 | 6.31486E−01 |
| A16 = | −1.30278E+01 | −3.16889E+00 | −2.45794E+00 | −1.15681E−01 |

TABLE 2-continued

Aspheric Coefficients

| | Surface # | | | |
|---|---|---|---|---|
| | 6 | 7 | 8 | 9 |
| k = | 5.21668E+00 | 0.00000E+00 | −3.80220E+00 | −2.99628E+00 |
| A4 = | −6.77805E−02 | 4.81749E−02 | −2.25623E−01 | −1.67256E−01 |
| A6 = | 1.32369E−01 | 4.51541E−02 | 1.25777E−01 | 7.70112E−02 |
| A8 = | −1.49150E−01 | −4.60215E−02 | −5.78495E−02 | −2.47152E−02 |
| A10 = | 6.29759E−02 | 9.64991E−03 | 1.84474E−02 | 3.04145E−03 |
| A12 = | 2.49131E−03 | 2.44594E−03 | −2.78081E−03 | 6.53407E−04 |
| A14 = | −9.73877E−03 | −6.82981E−04 | 1.40854E−04 | −2.44938E−04 |
| A16 = | 2.03662E−03 | −5.86335E−05 | −1.37212E−06 | 2.43698E−05 |

In Table 1, the curvature radius, the thickness and the focal length are shown in millimeter (mm). Surface numbers 0-14 represent the surfaces sequentially arranged from the object-side to the image-side along the optical axis. In Table 2, k represents the conic coefficient of the equation of the aspheric surface profiles. A1-A16 represent the aspheric coefficients ranging from the 1st order to the 16th. All labels for Tables of the remaining embodiments share the same definitions as Table 1 and Table 2 of the first embodiment, and will not be stated again.

Figure 3:
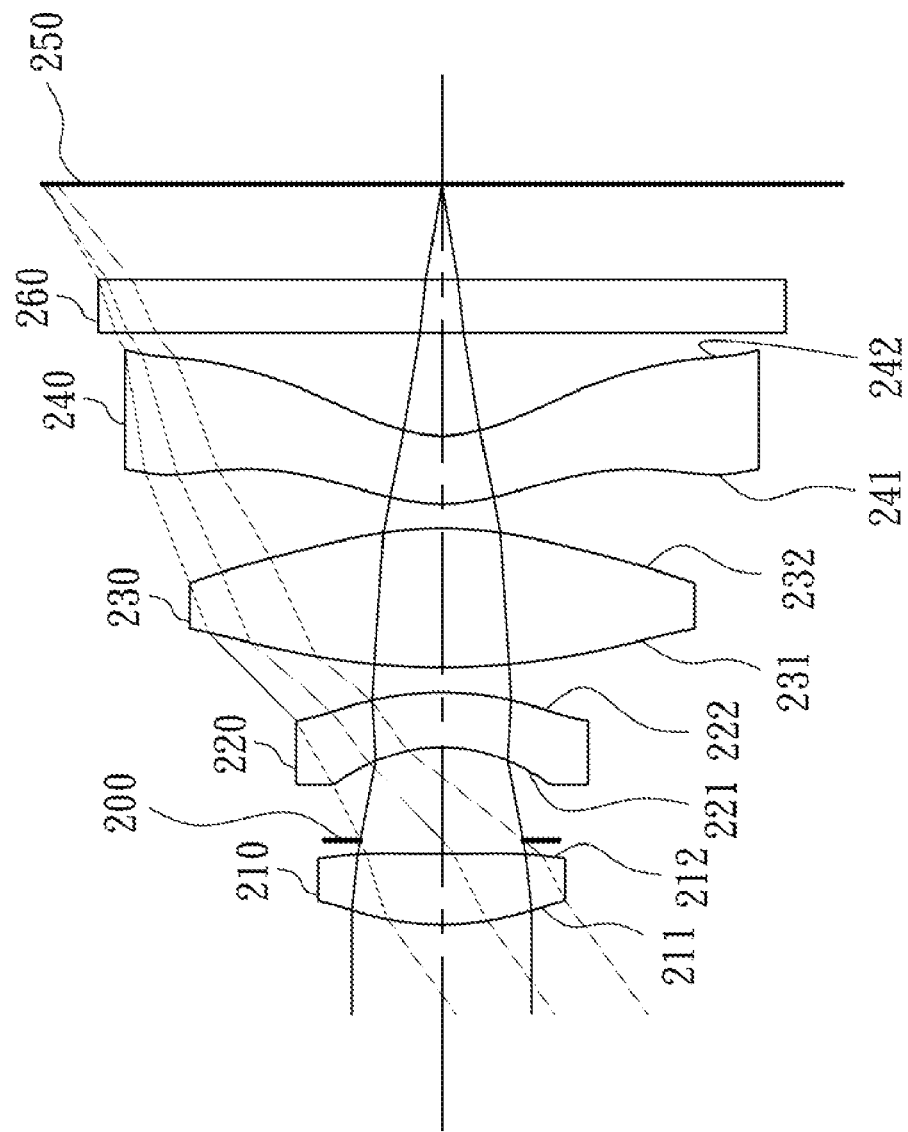
FIG. 3 is a schematic view of a photographing optical lens assembly according to the second embodiment.
Figure 4:
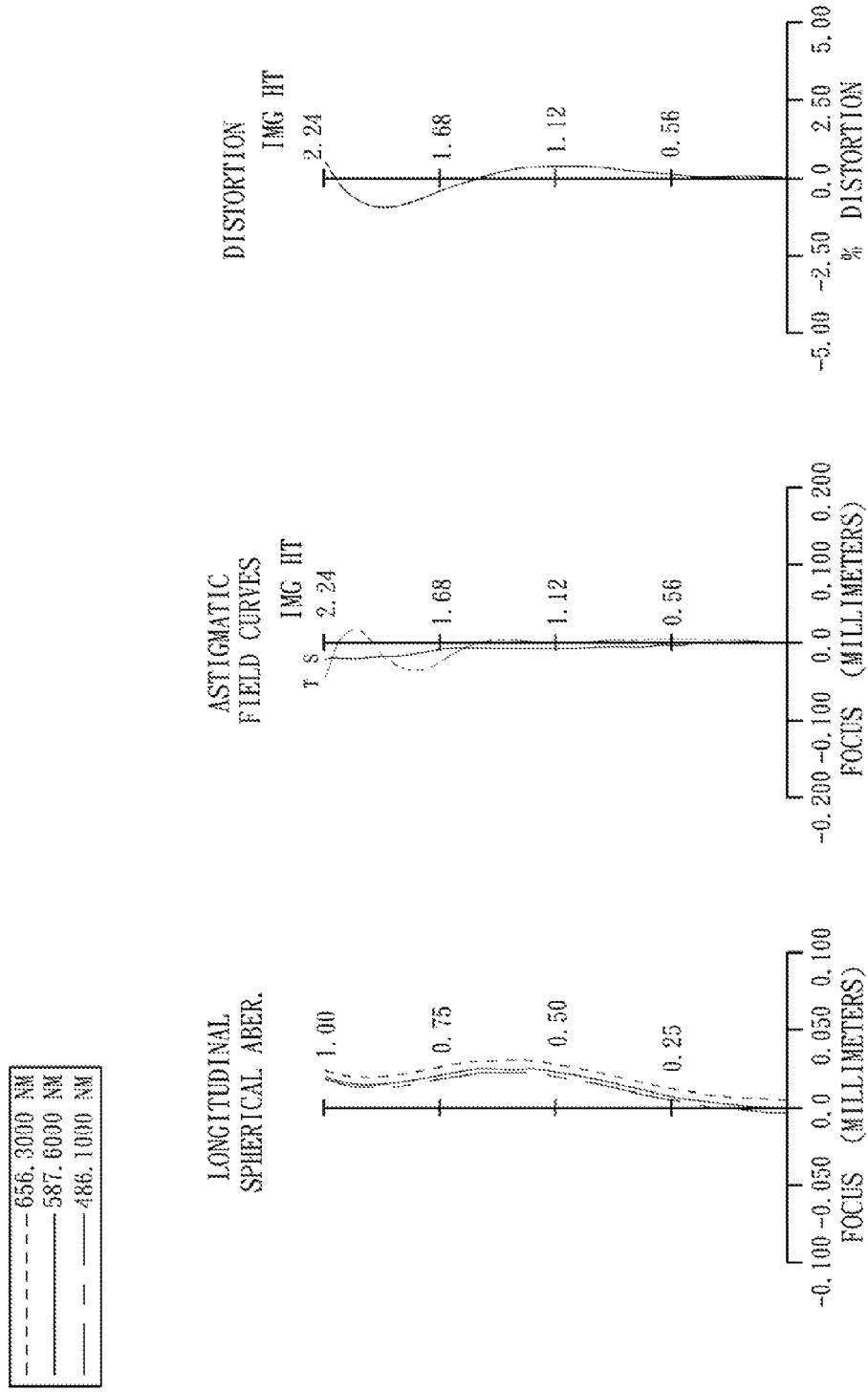
FIG. 4 shows spherical aberration curves, astigmatic field curves and distortion curve of the photographing optical lens assembly according to the second embodiment.

FIG. 3 is a schematic view of a photographing optical lens assembly according to the second embodiment. FIG. 4 shows spherical aberration curves, astigmatic field curves and distortion curve of the photographing optical lens assembly according to the second embodiment. In FIG. 3, the photographing optical lens assembly includes, in order from an object side to an image side: the first lens element 210, an aperture stop 200, the second lens element 220, the third lens element 230, the fourth lens element 240, an IR (infrared) cut filter 260 and an image plane 250.

The first lens element 210 is made of plastic material. The first lens element 210 with positive refractive power has a convex object-side surface 211 and a concave image-side surface 212. The object-side surface 211 and the image-side surface 212 of the first lens element 210 are aspheric.

The second lens element 220 is made of plastic material. The second lens element 220 with negative refractive power has a concave object-side surface 221 and a convex image-side surface 222. The object-side surface 221 and the image-side surface 222 of the second lens element 220 are aspheric.

The third lens element 230 is made of plastic material. The third lens element 230 with positive refractive power has a convex object-side surface 231 and a convex image-side surface 232. The object-side surface 231 and the image-side surface 232 of the third lens element 230 are aspheric.

The fourth lens element 240 is made of plastic material. The fourth lens element 240 with negative refractive power has a convex object-side surface 241 and a concave image-side surface 242. The fourth lens element 240 has inflection points formed on both the object-side surface 241 and the image-side surface 242 thereof. The object-side surface 241 and the image-side surface 242 of the fourth lens element 240 are aspheric.

The IR cut filter 260 is located behind the fourth lens element 240 and will not affect the focal length of the photographing optical lens assembly.

The equation of the aspheric surface profiles of the above lens elements of the second embodiment is the same as that of the first embodiment, and will not be stated herein again.

In the photographing optical lens assembly according to the second embodiment, the definitions of $f$, Fno, and HFOV are the same as those stated in the first embodiment with corresponding values for the second embodiment, and they satisfy the following relationships:

$f=3.06$ mm;

Fno=3.00; and

HFOV=36.2 degrees.

In the photographing optical lens assembly according to the second embodiment, the definitions of all variables for conditions provided in the claims (V1, V2, CT3, T12, R1, R2, R3, R4, R5, R6, R7, R8, f2, f4, SL, TTL, and ImgH) are the same as those stated in the first embodiment with corresponding values for the second embodiment, and they satisfy the following relationships:

$V1-V2=34.5$;

$CT3/f=0.25$;

$T12/f=0.20$;

$|R1/R2|=0.08$;

$R5/R6=-1.71$;

$(R3+R4)/(R3-R4)=-2.89$;

$(R7+R8)/(R7-R8)=5.49$;

$f/f2=-0.98$;

$f/f4=-0.41$;

$SL/TTL=0.88$; and $TTL/ImgH=1.81$.

The detailed optical data of the second embodiment is shown in Table 3, and the aspheric surface data is shown in Table 4 as follows.

TABLE 3

2nd Embodiment
f = 3.06 mm, Fno = 3.00, HFOV = 36.2 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.52036 (ASP) | 0.403 | Plastic | 1.544 | 55.9 | 3.02 |
| 2 | | 18.49445 (ASP) | 0.070 | | | | |
| 3 | Ape. Stop | Plano | 0.527 | | | | |
| 4 | Lens 2 | −0.91258 (ASP) | 0.304 | Plastic | 1.650 | 21.4 | −3.12 |
| 5 | | −1.87836 (ASP) | 0.140 | | | | |
| 6 | Lens 3 | 3.75963 (ASP) | 0.779 | Plastic | 1.544 | 55.9 | 2.67 |
| 7 | | −2.20078 (ASP) | 0.140 | | | | |
| 8 | Lens 4 | 1.04246 (ASP) | 0.381 | Plastic | 1.544 | 55.9 | −7.38 |
| 9 | | 0.72098 (ASP) | 0.576 | | | | |
| 10 | IR-filter | Plano | 0.300 | Glass | 1.517 | 64.2 | — |
| 11 | | Plano | 0.535 | | | | |
| 12 | Image | Plano | — | | | | |

The reference wavelength (d-line) is 587.6 nm.

TABLE 4

Aspheric Coefficients

| | Surface # | | | |
|---|---|---|---|---|
| | 1 | 2 | 4 | 5 |
| k = | −9.91985E−01 | −1.91165E+02 | −4.65146E+00 | 8.32243E−01 |
| A4 = | −1.88085E−02 | −1.19501E−01 | −8.51909E−01 | −2.01375E−01 |
| A6 = | −8.23236E−02 | −1.06954E−01 | 2.05618E+00 | 8.70795E−01 |
| A8 = | 8.47925E−01 | −5.59555E−01 | −3.86874E+00 | −1.39770E+00 |
| A10 = | −4.77462E+00 | 8.35023E−01 | 5.35721E+00 | 1.84547E+00 |
| A12 = | 5.53972E+00 | −1.07213E+00 | −6.16945E+00 | −1.44470E+00 |
| A14 = | 5.44326E+00 | 3.09655E+00 | 5.14749E+00 | 6.28227E−01 |
| A16 = | −1.18198E+01 | −3.16889E+00 | −2.27569E+00 | −1.54163E−01 |

| | Surface # | | | |
|---|---|---|---|---|
| | 6 | 7 | 8 | 9 |
| k = | 5.33403E+00 | −6.10847E−01 | −3.66829E+00 | −2.80719E+00 |
| A4 = | −7.21444E−02 | 4.45654E−02 | −2.25265E−01 | −1.61199E−01 |
| A6 = | 1.33447E−01 | 4.73019E−02 | 1.25957E−01 | 7.81281E−02 |
| A8 = | −1.48912E−01 | −4.60386E−02 | −5.77818E−02 | −2.45315E−02 |
| A10 = | 6.29155E−02 | 9.21106E−03 | 1.84804E−02 | 3.09463E−03 |
| A12 = | 2.43243E−03 | 2.34282E−03 | −2.77348E−03 | 6.52933E−04 |
| A14 = | −9.86226E−03 | −6.76282E−04 | 1.41259E−04 | −2.46876E−04 |
| A16 = | 1.98943E−03 | −3.48208E−05 | −2.18298E−06 | 2.45966E−05 |

Figure 5:
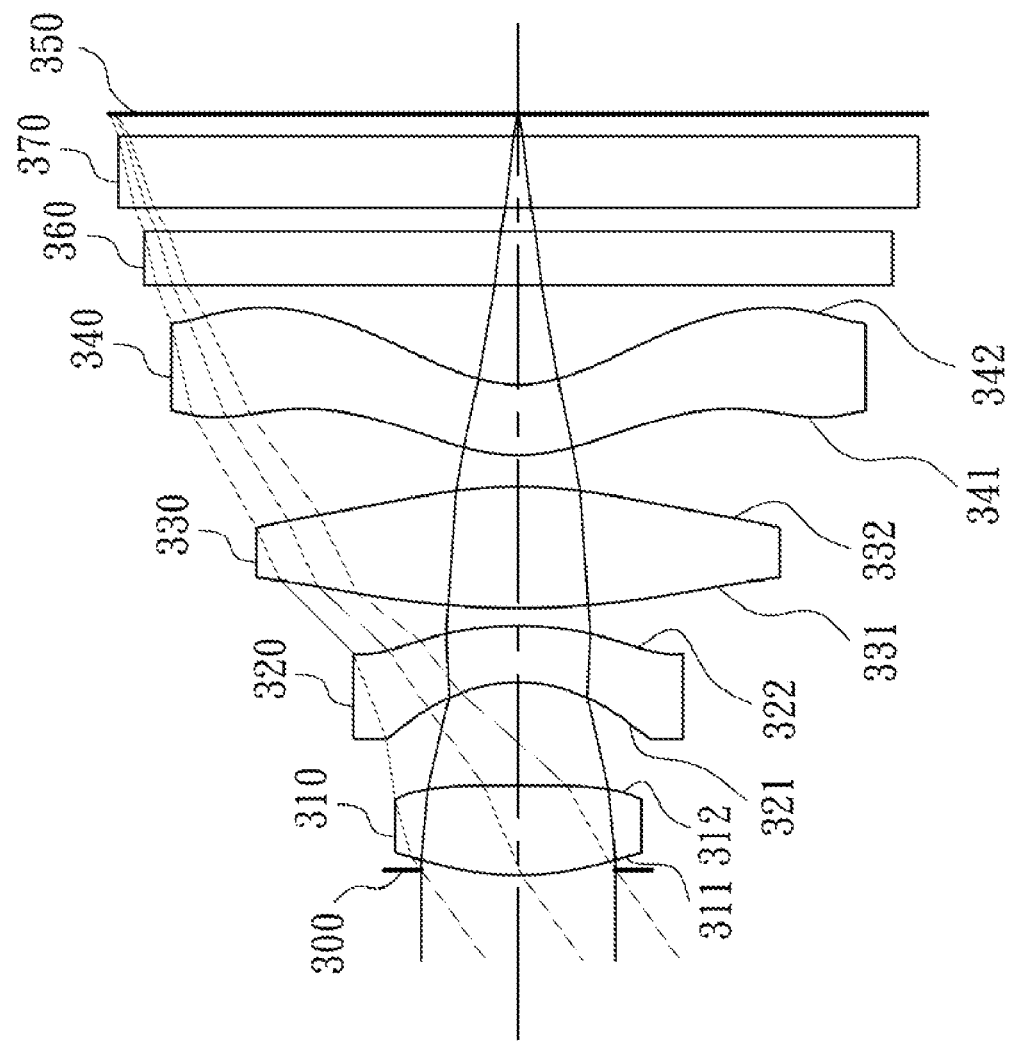
FIG. 5 is a schematic view of a photographing optical lens assembly according to the third embodiment.
Figure 6:
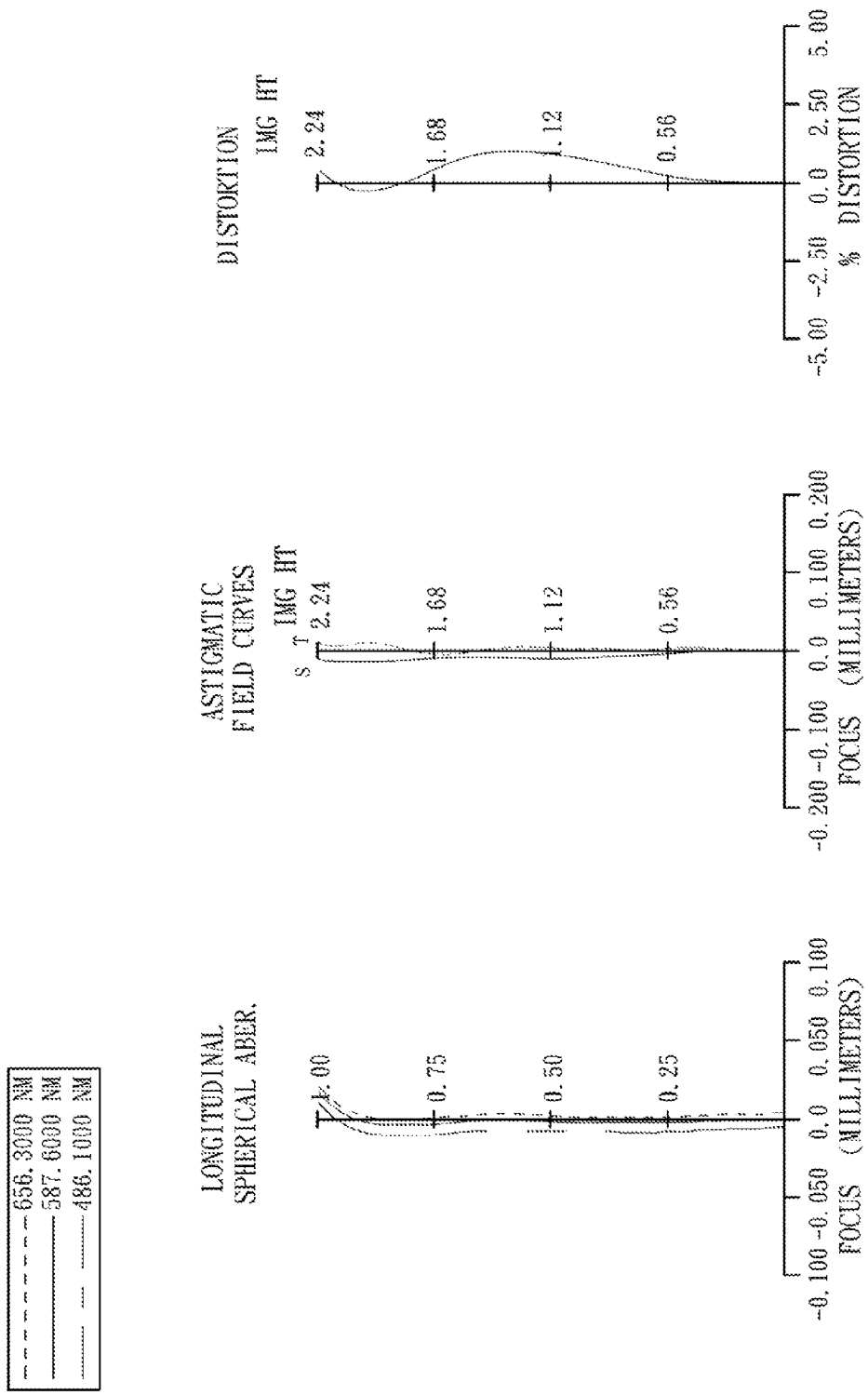
FIG. 6 shows spherical aberration curves, astigmatic field curves and distortion curve of the photographing optical lens assembly according to the third embodiment.

FIG. 5 is a schematic view of a photographing optical lens assembly according to the third embodiment. FIG. 6 shows spherical aberration curves, astigmatic field curves and distortion curve of the photographing optical lens assembly according to the third embodiment. In FIG. 5, the photographing optical lens assembly includes, in order from an object side to an image side: an aperture stop 300, the first lens element 310, the second lens element 320, the third lens element 330, the fourth lens element 340, an IR (infrared) cut filter 360, a cover glass 370 and an image plane 350.

The first lens element 310 is made of plastic material. The first lens element 310 with positive refractive power has a convex object-side surface 311 and a convex image-side surface 312. The object-side surface 311 and the image-side surface 312 of the first lens element 310 are aspheric.

The second lens element 320 is made of plastic material. The second lens element 320 with negative refractive power has a concave object-side surface 321 and a convex image-side surface 322. The object-side surface 321 and the image-side surface 322 of the second lens element 320 are aspheric.

The third lens element 330 is made of plastic material. The third lens element 330 with positive refractive power has a convex object-side surface 331 and a convex image-side surface 332. The object-side surface 331 and the image-side surface 332 of the third lens element 330 are aspheric.

The fourth lens element 340 is made of plastic material. The fourth lens element 340 with negative refractive power has a convex object-side surface 341 and a concave image-side surface 342. The fourth lens element 340 has inflection points formed on both the object-side surface 341 and the image-side surface 342 thereof. The object-side surface 341 and the image-side surface 342 of the fourth lens element 340 are aspheric.

The IR cut filter 360 and the cover glass 370 are located behind the fourth lens element 340 and will not affect the focal length of the photographing optical lens assembly.

The equation of the aspheric surface profiles of the above lens elements of the third embodiment is the same as that of the first embodiment, and will not be stated herein again.

In the photographing optical lens assembly according to the third embodiment, the definitions of f, Fno, and HFOV are the same as those stated in the first embodiment with corresponding values for the third embodiment, and they satisfy the following relationships:

$f=3.08$ mm;

Fno=2.85; and

HFOV=36.0 degrees.

In the photographing optical lens assembly according to the third embodiment, the definitions of all variables for conditions provided in the claims (V1, V2, CT3, T12, R1, R2, R3, R4, R5, R6, R7, R8, f2, f4, SL, TTL, and ImgH) are the same as those stated in the first embodiment with corresponding values for the third embodiment, and they satisfy the following relationships:

$V1-V2=32.4$;

$CT3/f=0.22$;

$T12/f=0.19$;

$|R1/R2|=0.09$;

$R5/R6=-1.70$;

$(R3+R4)/(R3-R4)=-2.43$;

$(R7+R8)/(R7-R8)=8.13$;

$f/f2=-1.15$;

$f/f4=-0.17$;

$SL/TTL=0.99$; and $TTL/ImgH=1.78$.

The detailed optical data of the third embodiment is shown in Table 5, and the aspheric surface data is shown in Table 6 as follows.

TABLE 5

3rd Embodiment
f = 3.08 mm, Fno = 2.85, HFOV = 36.0 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.028 | | | | |
| 2 | Lens 1 | 1.58545 (ASP) | 0.501 | Plastic | 1.530 | 55.8 | 2.78 |
| 3 | | −18.41620 (ASP) | 0.573 | | | | |
| 4 | Lens 2 | −0.89091 (ASP) | 0.309 | Plastic | 1.632 | 23.4 | −2.68 |
| 5 | | −2.13532 (ASP) | 0.100 | | | | |
| 6 | Lens 3 | 4.31040 (ASP) | 0.674 | Plastic | 1.530 | 55.8 | 3.12 |
| 7 | | −2.53232 (ASP) | 0.176 | | | | |
| 8 | Lens 4 | 0.94954 (ASP) | 0.394 | Plastic | 1.530 | 55.8 | −18.56 |
| 9 | | 0.74150 (ASP) | 0.550 | | | | |
| 10 | IR-filter | Plano | 0.300 | Glass | 1.517 | 64.2 | — |
| 11 | | Plano | 0.130 | | | | |
| 12 | Cover-glass | Plano | 0.400 | Glass | 1.517 | 64.2 | — |
| 13 | | Plano | 0.122 | | | | |
| 14 | Image | Plano | — | | | | |

The reference wavelength (d-line) is 587.6 nm.

TABLE 6

Aspheric Coefficients

| | Surface # | | | |
|---|---|---|---|---|
| | 2 | 3 | 4 | 5 |
| k = | −9.61820E−01 | 0.00000E+00 | −4.47015E+00 | 0.00000E+00 |
| A4 = | −1.35894E−02 | −1.64202E−01 | −8.90354E−01 | −3.02958E−01 |
| A6 = | −2.50349E−01 | −1.38641E−01 | 1.88836E+00 | 9.17413E−01 |
| A8 = | 9.93674E−01 | −3.65356E−01 | −3.61231E+00 | −1.37783E+00 |
| A10 = | −3.39050E+00 | 7.58137E−01 | 5.85314E+00 | 1.83475E+00 |
| A12 = | 2.23286E+00 | −2.08728E+00 | −5.91359E+00 | −1.44482E+00 |
| A14 = | 5.84747E+00 | 2.47794E+00 | 4.30698E+00 | 6.43930E−01 |
| A16 = | −1.30277E+01 | −2.59358E+00 | −2.81335E+00 | −1.46605E−01 |

| | Surface # | | | |
|---|---|---|---|---|
| | 6 | 7 | 8 | 9 |
| k = | 5.45995E+00 | 0.00000E+00 | −2.67293E+00 | −2.49671E+00 |
| A4 = | −7.18824E−02 | 6.36671E−02 | −2.25260E−01 | −1.62265E−01 |
| A6 = | 1.34612E−01 | 4.03373E−02 | 1.22742E−01 | 7.46981E−02 |
| A8 = | −1.47122E−01 | −4.52628E−02 | −5.83038E−02 | −2.48530E−02 |
| A10 = | 6.26038E−02 | 9.93237E−03 | 1.83882E−02 | 3.05261E−03 |
| A12 = | 2.10354E−03 | 2.47722E−03 | −2.78382E−03 | 6.45337E−04 |
| A14 = | −9.79566E−03 | −7.06908E−04 | 1.44858E−04 | −2.49317E−04 |
| A16 = | 2.12813E−03 | −8.18869E−05 | 1.48342E−06 | 2.49209E−05 |

Figure 7:
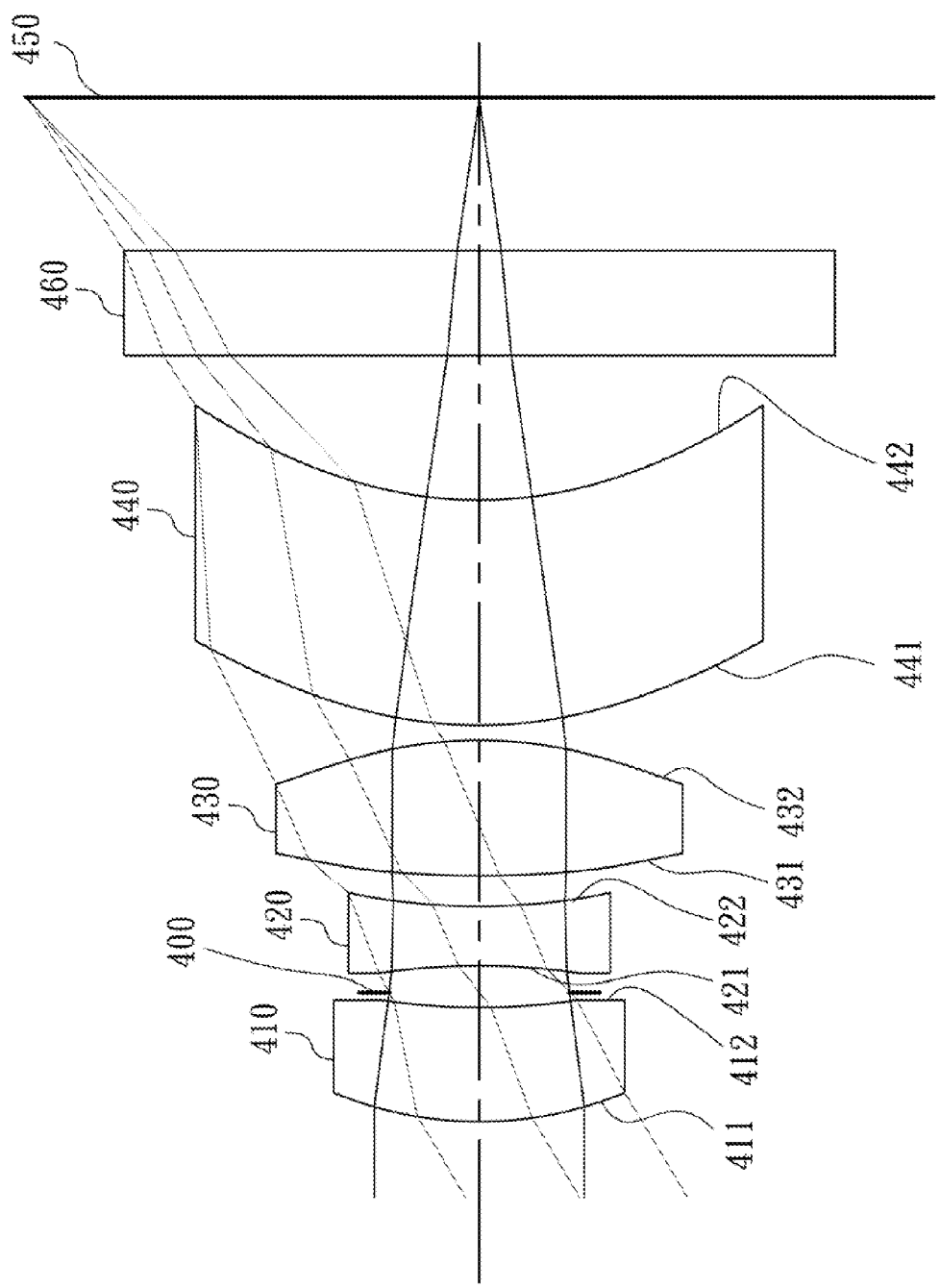
FIG. 7 is a schematic view of a photographing optical lens assembly according to the fourth embodiment.
Figure 8:
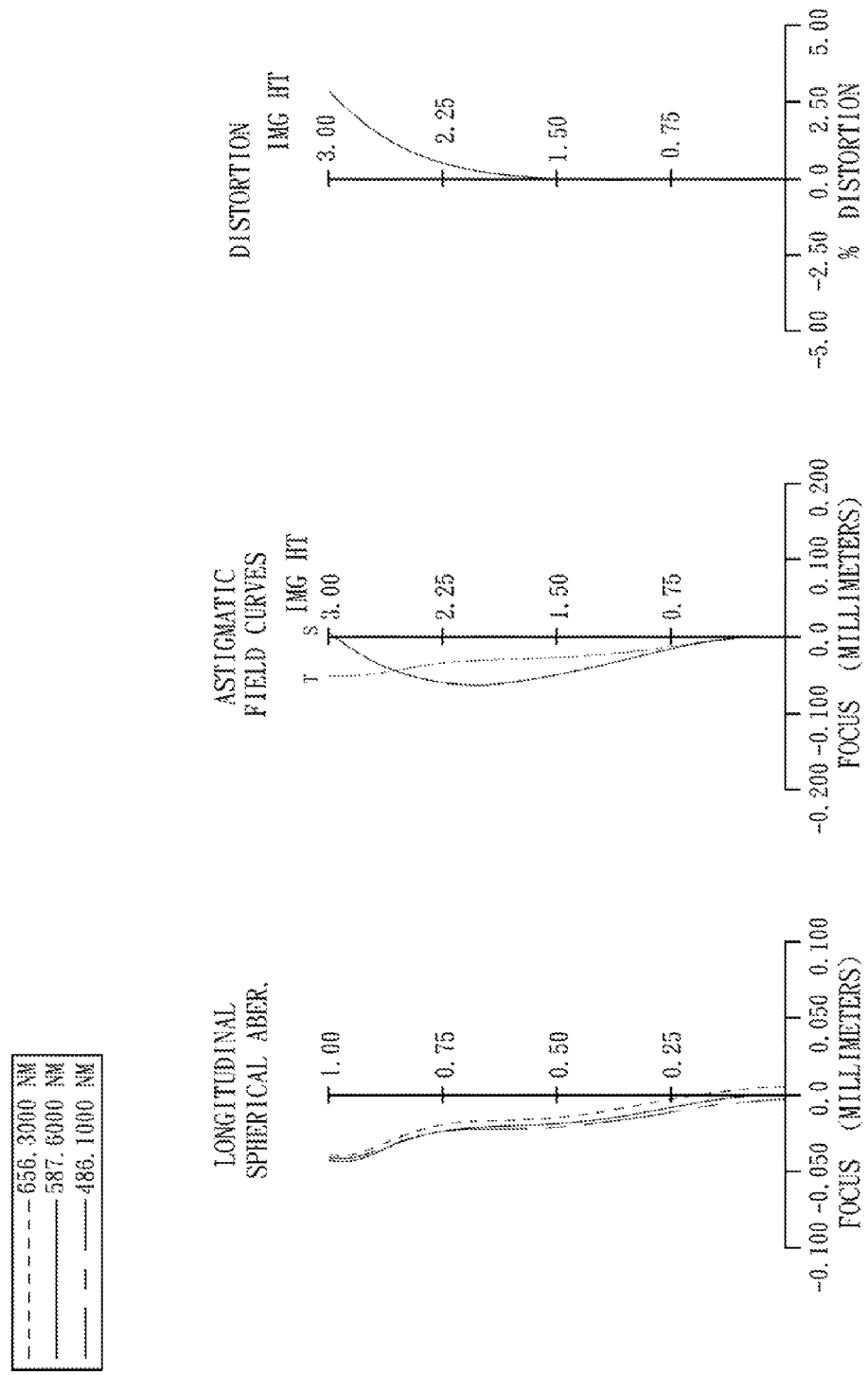
FIG. 8 shows spherical aberration curves, astigmatic field curves and distortion curve of the photographing optical lens assembly according to the fourth embodiment.

FIG. 7 is a schematic view of a photographing optical lens assembly according to the fourth embodiment. FIG. 8 shows spherical aberration curves, astigmatic field curves and distortion curve of the photographing optical lens assembly according to the fourth embodiment. In FIG. 7, the photographing optical lens assembly includes, in order from an object side to an image side: the first lens element 410, an aperture stop 400, the second lens element 420, the third lens element 430, the fourth lens element 440, an IR (infrared) cut filter 460 and an image plane 450.

The first lens element 410 is made of plastic material. The first lens element 410 with positive refractive power has a convex object-side surface 411 and a concave image-side surface 412. The object-side surface 411 and the image-side surface 412 of the first lens element 410 are aspheric.

The second lens element 420 is made of plastic material. The second lens element 420 with negative refractive power has a concave object-side surface 421 and a concave image-side surface 422. The object-side surface 421 and the image-side surface 422 of the second lens element 420 are aspheric.

The third lens element 430 is made of plastic material. The third lens element 430 with positive refractive power has a convex object-side surface 431 and a convex image-side surface 432. The object-side surface 431 and the image-side surface 432 of the third lens element 430 are aspheric.

The fourth lens element 440 is made of plastic material. The fourth lens element 440 with negative refractive power has a convex object-side surface 441 and a concave image-side surface 442. The fourth lens element 440 has inflection points formed on both the object-side surface 441 and the image-side surface 442 thereof. The object-side surface 441 and the image-side surface 442 of the fourth lens element 440 are aspheric.

The IR cut filter 460 is located behind the fourth lens element 440 and will not affect the focal length of the photographing optical lens assembly.

The equation of the aspheric surface profiles of the above lens elements of the fourth embodiment is the same as that of the first embodiment, and will not be stated herein again.

In the photographing optical lens assembly according to the fourth embodiment, the definitions off, Fno, and HFOV are the same as those stated in the first embodiment with corresponding values for the fourth embodiment, and they satisfy the following relationships:

$f=4.88$ mm;

Fno=3.50; and

HFOV=31.0 degrees.

In the photographing optical lens assembly according to the fourth embodiment, the definitions of all variables for conditions provided in the claims (V1, V2, CT3, T12, R1, R2, R3, R4, R5, R6, R7, R8, f2, f4, SL, TTL, and ImgH) are the same as those stated in the first embodiment with corresponding values for the fourth embodiment, and they satisfy the following relationships:

$V1-V2=13.9$;

$CT3/f=0.18$;

$T12/f=0.06$;

$|R1/R2|=0.57$;

$R5/R6=-2.48$;

$(R3+R4)/(R3-R4)=0.04$;

$(R7+R8)/(R7-R8)=75.07$;

$f/f2=-1.40$;

$f/f4=0.15$;

$SL/TTL=0.87$; and $TTL/ImgH=2.19$.

The detailed optical data of the fourth embodiment is shown in Table 7, and the aspheric surface data is shown in Table 8 as follows.

TABLE 7

4th Embodiment f = 4.88 mm, Fno = 3.50, HFOV = 31.0 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 2.52212 | 0.764 | Glass | 1.834 | 37.3 | 5.96 |
| 2 | | 4.41448 | 0.100 | | | | |
| 3 | Ape. Stop | Plano | 0.173 | | | | |
| 4 | Lens 2 | −4.64060 (ASP) | 0.400 | Plastic | 1.633 | 23.4 | −3.48 |
| 5 | | 4.32311 (ASP) | 0.204 | | | | |
| 6 | Lens 3 | 7.26194 (ASP) | 0.897 | Plastic | 1.544 | 55.9 | 3.95 |
| 7 | | −2.92505 (ASP) | 0.100 | | | | |
| 8 | Lens 4 | 2.88177 (ASP) | 1.500 | Plastic | 1.544 | 55.9 | 32.82 |
| 9 | | 2.80600 (ASP) | 0.963 | | | | |
| 10 | IR-filter | Plano | 0.700 | Glass | 1.517 | 64.2 | — |
| 11 | | Plano | 1.016 | | | | |
| 12 | Image | Plano | — | | | | |

The reference wavelength (d-line) is 587.6 nm.

TABLE 8

Aspheric Coefficients

| | Surface # | | |
|---|---|---|---|
| | 4 | 5 | 6 |
| k = | −3.91311E+00 | −1.78246E+01 | −2.90912E+00 |
| A4 = | −6.49641E−03 | 1.46572E−02 | 4.26823E−03 |
| A6 = | −2.79184E−02 | 1.91703E−02 | 2.27272E−03 |
| A8 = | 7.74638E−02 | −1.43461E−03 | 2.42212E−03 |
| A10 = | 1.86967E−01 | −9.26915E−03 | 4.65559E−04 |
| A12 = | −4.69530E−01 | 6.94960E−04 | −1.30246E−03 |

| | Surface # | | |
|---|---|---|---|
| | 7 | 8 | 9 |
| k = | 6.91437E−02 | −1.05269E+00 | −8.21800E−02 |
| A4 = | 3.59515E−03 | −6.13171E−03 | −4.25289E−03 |
| A6 = | 4.53563E−03 | 7.55714E−04 | −1.23443E−03 |
| A8 = | −4.31317E−04 | 3.22042E−04 | 1.08962E−04 |
| A10 = | 7.64206E−04 | −9.22381E−05 | 3.79074E−05 |
| A12 = | −2.20064E−04 | −5.38502E−06 | −4.86763E−06 |
| A14 = | | −2.27961E−06 | 8.92555E−07 |
| A16 = | | 9.55732E−07 | −6.05662E−07 |

Figure 9:
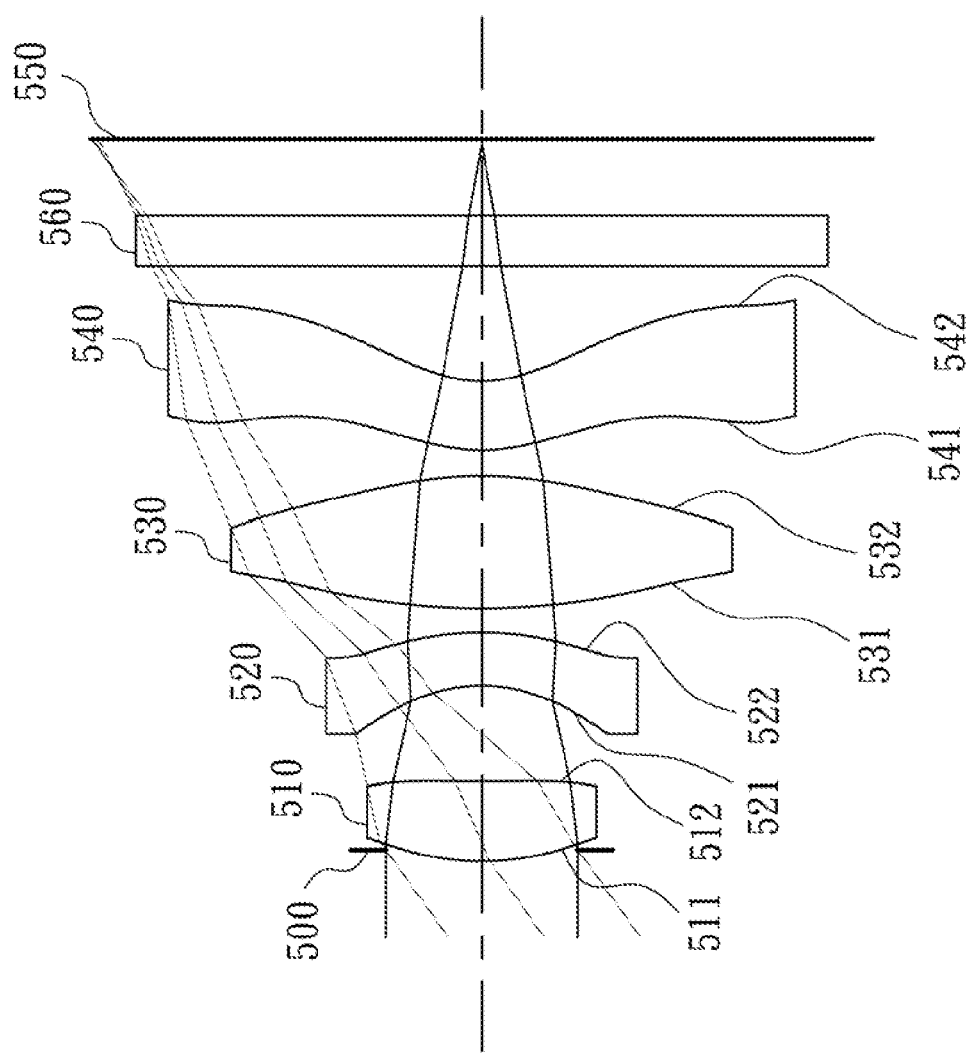
FIG. 9 is a schematic view of a photographing optical lens assembly according to the fifth embodiment.
Figure 10:
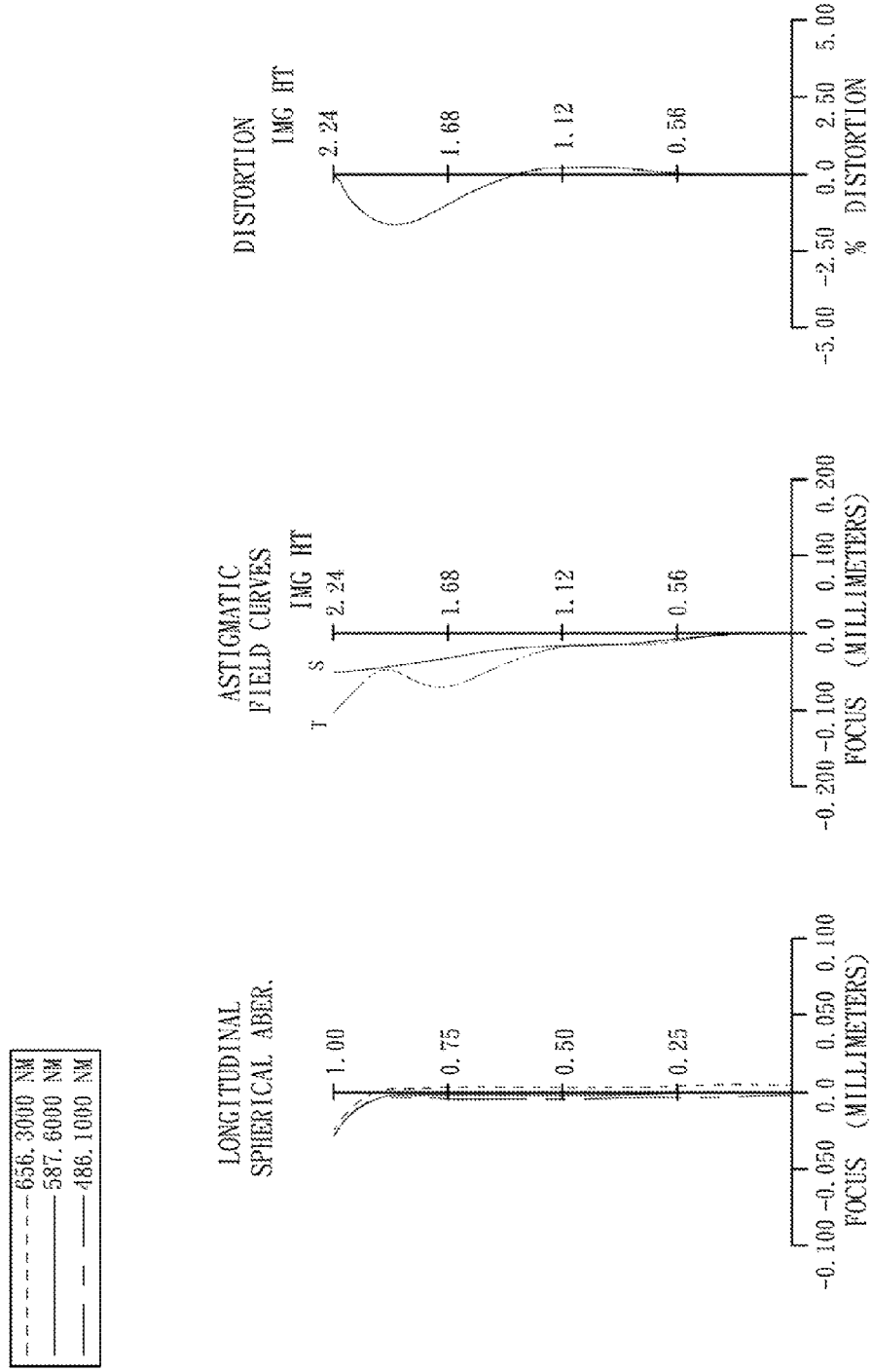
FIG. 10 shows spherical aberration curves, astigmatic field curves and distortion curve of the photographing optical lens assembly according to the fifth embodiment.

FIG. 9 is a schematic view of a photographing optical lens assembly according to the fifth embodiment. FIG. 10 shows spherical aberration curves, astigmatic field curves and distortion curve of the photographing optical lens assembly according to the fifth embodiment. In FIG. 9, the photographing optical lens assembly includes, in order from an object side to an image side: an aperture stop 500, the first lens element 510, the second lens element 520, the third lens element 530, the fourth lens element 540, an IR (infrared) cut filter 560 and an image plane 550.

The first lens element 510 is made of plastic material. The first lens element 510 with positive refractive power has a convex object-side surface 511 and a concave image-side surface 512. The object-side surface 511 and the image-side surface 512 of the first lens element 510 are aspheric.

The second lens element 520 is made of plastic material. The second lens element 520 with negative refractive power has a concave object-side surface 521 and a convex image-side surface 522. The object-side surface 521 and the image-side surface 522 of the second lens element 520 are aspheric.

The third lens element 530 is made of plastic material. The third lens element 530 with positive refractive power has a convex object-side surface 531 and a convex image-side surface 532. The object-side surface 531 and the image-side surface 532 of the third lens element 530 are aspheric.

The fourth lens element 540 is made of plastic material. The fourth lens element 540 with negative refractive power has a convex object-side surface 541 and a concave image-side surface 542. The fourth lens element 540 has inflection points formed on both the object-side surface 541 and the image-side surface 542 thereof. The object-side surface 541 and the image-side surface 542 of the fourth lens element 540 are aspheric.

The IR cut filter 560 is located behind the fourth lens element 540 and will not affect the focal length of the photographing optical lens assembly.

The equation of the aspheric surface profiles of the above lens elements of the fifth embodiment is the same as that of the first embodiment, and will not be stated herein again.

In the photographing optical lens assembly according to the fifth embodiment, the definitions of f, Fno, and HFOV are the same as those stated in the first embodiment with corresponding values for the fifth embodiment, and they satisfy the following relationships:

$f = 3.11$ mm;

Fno=2.80; and

HFOV=35.8 degrees.

In the photographing optical lens assembly according to the fifth embodiment, the definitions of all variables for conditions provided in the claims (V1, V2, CT3, T12, R1, R2, R3, R4, R5, R6, R7, R8, f2, f4, SL, TTL, and ImgH) are the same as those stated in the first embodiment with corresponding values for the fifth embodiment, and they satisfy the following relationships:

$V1 - V2 = 34.4$;

$CT3/f = 0.25$;

$T12/f = 0.18$;

$|R1/R2| = 0.04$;

$R5/R6 = -1.67$;

$(R3+R4)/(R3-R4) = -2.88$;

$(R7+R8)/(R7-R8) = 5.35$;

$f/f2 = -1.00$;

$f/f4 = -0.43$;

$SL/TTL = 0.98$; and $TTL/ImgH = 1.82$.

The detailed optical data of the fifth embodiment is shown in Table 9, and the aspheric surface data is shown in Table 10 as follows.

TABLE 9

5th Embodiment
f = 3.11 mm, Fno = 2.80, HFOV = 35.8 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.065 | | | | |
| 2 | Lens 1 | 1.52574 (ASP) | 0.462 | Plastic | 1.530 | 55.8 | 2.99 |
| 3 | | 36.28095 (ASP) | 0.556 | | | | |
| 4 | Lens 2 | −0.91435 (ASP) | 0.303 | Plastic | 1.650 | 21.4 | −3.11 |
| 5 | | −1.88853 (ASP) | 0.140 | | | | |
| 6 | Lens 3 | 3.77949 (ASP) | 0.764 | Plastic | 1.530 | 55.8 | 2.79 |
| 7 | | −2.25755 (ASP) | 0.151 | | | | |
| 8 | Lens 4 | 1.02089 (ASP) | 0.396 | Plastic | 1.530 | 55.8 | −7.31 |
| 9 | | 0.69932 (ASP) | 0.663 | | | | |

TABLE 9-continued

5th Embodiment
f = 3.11 mm, Fno = 2.80, HFOV = 35.8 deg.

| Surface # | | Curvature Radius | Thickness | Material | Index | Abbe # | Focal length |
|---|---|---|---|---|---|---|---|
| 10 | IR-filter | Plano | 0.300 | Glass | 1.517 | 64.2 | — |
| 11 | | Plano | 0.438 | | | | |
| 12 | Image | Plano | — | | | | |

The reference wavelength (d-line) is 587.6 nm.

TABLE 10

Aspheric Coefficients

| | Surface # | | | |
|---|---|---|---|---|
| | 2 | 3 | 4 | 5 |
| k = | −6.78210E−01 | 5.59744E+02 | −5.12257E+00 | 4.48878E−01 |
| A4 = | −7.19156E−03 | −1.17689E−01 | −8.35842E−01 | −1.87910E−01 |
| A6 = | −1.02054E−01 | −6.70654E−03 | 2.10522E+00 | 8.79599E−01 |
| A8 = | 8.78492E−01 | −4.44025E−01 | −3.77587E+00 | −1.40392E+00 |
| A10 = | −4.46307E+00 | 4.40093E−01 | 5.47187E+00 | 1.83734E+00 |
| A12 = | 5.79062E+00 | −1.07213E+00 | −6.16972E+00 | −1.44541E+00 |
| A14 = | 5.84685E+00 | 3.09655E+00 | 5.14749E+00 | 6.32747E−01 |
| A16 = | −1.30278E+01 | −3.16889E+00 | −2.27569E+00 | −1.28370E−01 |

| | Surface # | | | |
|---|---|---|---|---|
| | 6 | 7 | 8 | 9 |
| k = | 5.34608E+00 | −7.81823E−01 | −3.69025E+00 | −2.78243E+00 |
| A4 = | −7.12609E−02 | 4.77009E−02 | −2.26989E−01 | −1.61585E−01 |
| A6 = | 1.33012E−01 | 4.60609E−02 | 1.25962E−01 | 7.72381E−02 |
| A8 = | −1.49377E−01 | −4.62243E−02 | −5.77616E−02 | −2.46420E−02 |
| A10 = | 6.28195E−02 | 9.23869E−03 | 1.84792E−02 | 3.09130E−03 |
| A12 = | 2.46559E−03 | 2.35078E−03 | −2.77275E−03 | 6.55613E−04 |
| A14 = | −9.83504E−03 | −6.81741E−04 | 1.41160E−04 | −2.45974E−04 |
| A16 = | 1.99904E−03 | −4.12460E−05 | −2.24077E−06 | 2.46748E−05 |

Figure 11:
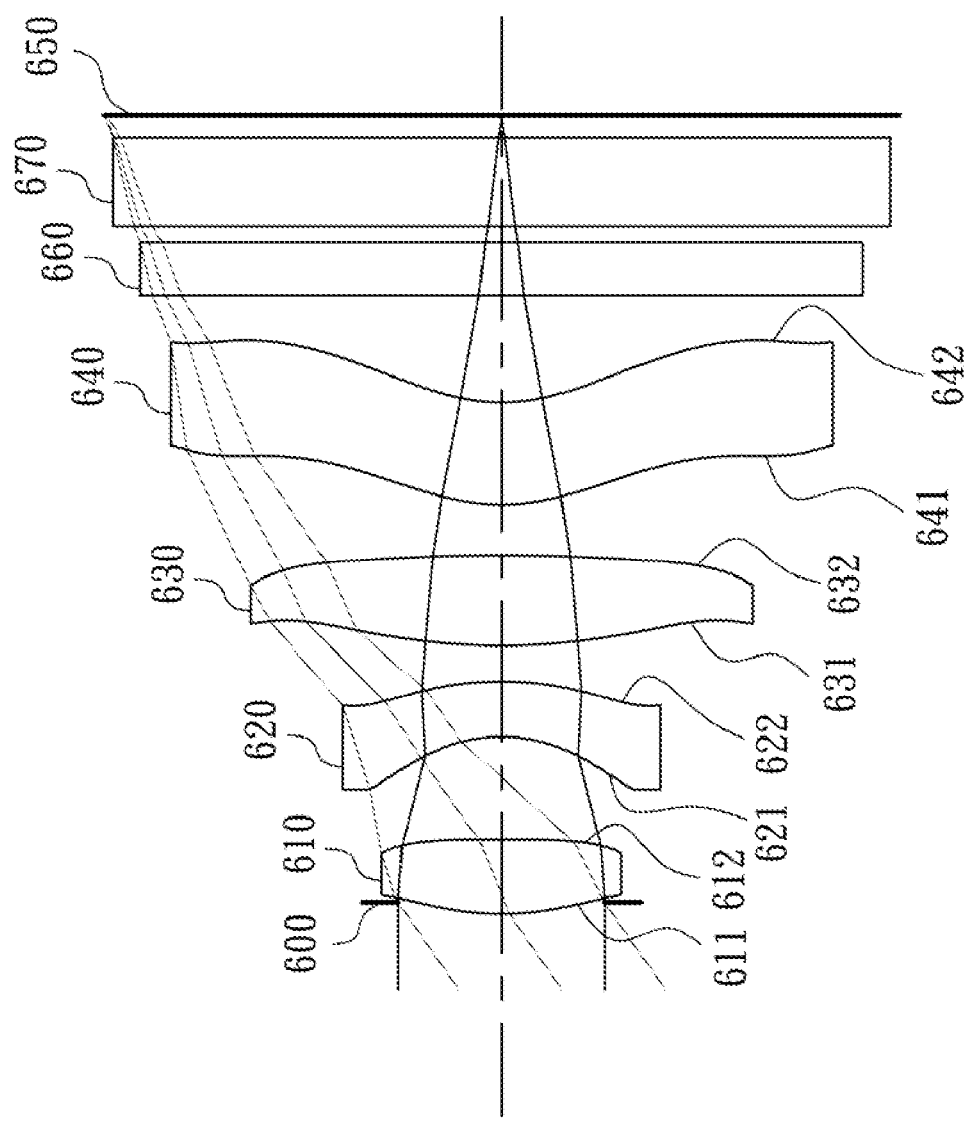
FIG. 11 is a schematic view of a photographing optical lens assembly according to the sixth embodiment.
Figure 12:
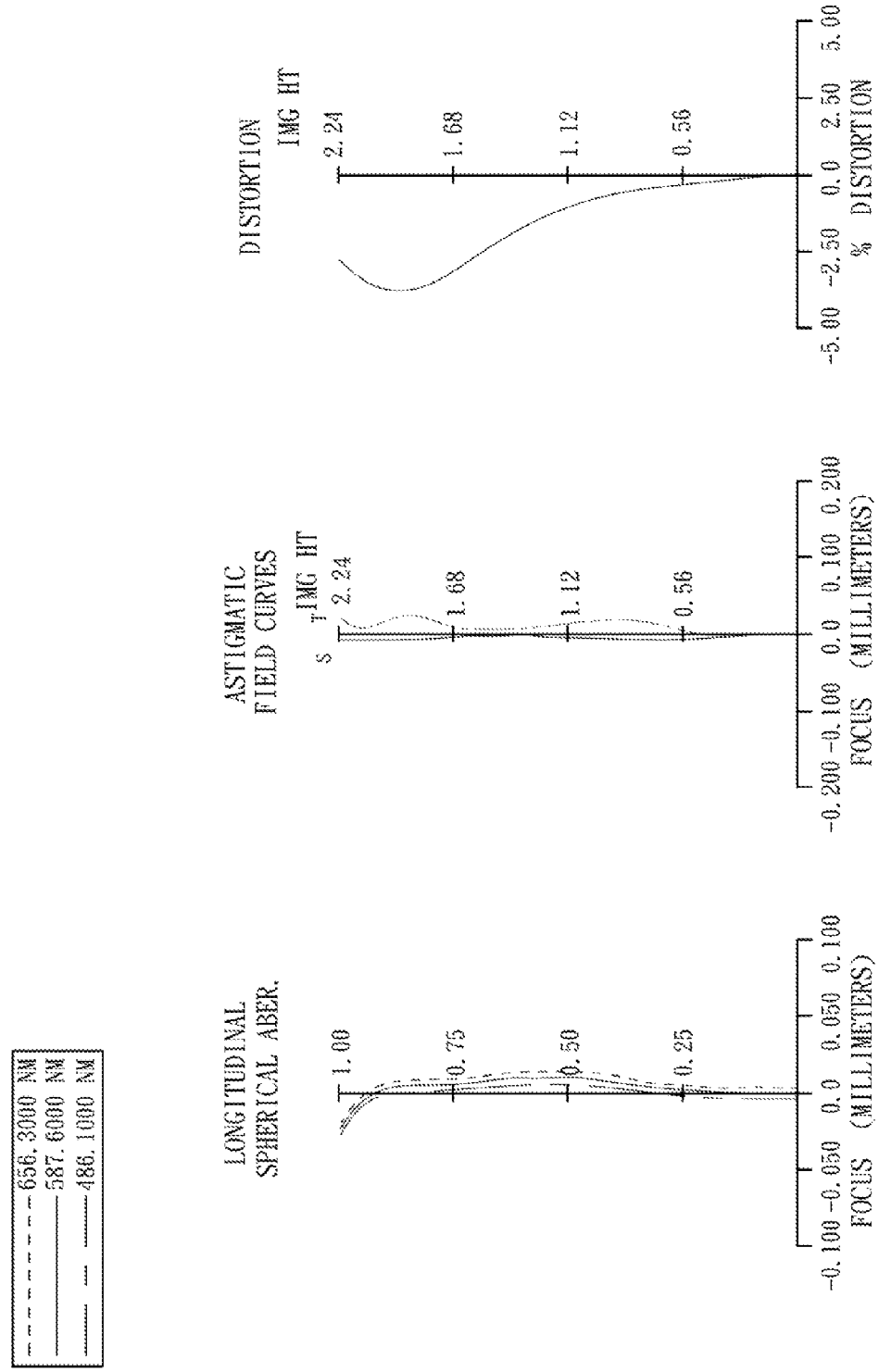
FIG. 12 shows spherical aberration curves, astigmatic field curves and distortion curve of the photographing optical lens assembly according to the sixth embodiment.

FIG. 11 is a schematic view of a photographing optical lens assembly according to the sixth embodiment. FIG. 12 shows spherical aberration curves, astigmatic field curves and distortion curve of the photographing optical lens assembly according to the sixth embodiment. In FIG. 11, the photographing optical lens assembly includes, in order from an object side to an image side: an aperture stop 600, the first lens element 610, the second lens element 620, the third lens element 630, the fourth lens element 640, an IR (infrared) cut filter 660, a cover glass 670 and an image plane 650.

The first lens element 610 is made of plastic material. The first lens element 610 with positive refractive power has a convex object-side surface 611 and a convex image-side surface 612. The object-side surface 611 and the image-side surface 612 of the first lens element 610 are aspheric.

The second lens element 620 is made of plastic material. The second lens element 620 with negative refractive power has a concave object-side surface 621 and a convex image-side surface 622. The object-side surface 621 and the image-side surface 622 of the second lens element 620 are aspheric.

The third lens element 630 is made of plastic material. The third lens element 630 with positive refractive power has a convex object-side surface 631 and a convex image-side surface 632. The object-side surface 631 and the image-side surface 632 of the third lens element 630 are aspheric.

The fourth lens element 640 is made of plastic material. The fourth lens element 640 with negative refractive power has a convex object-side surface 641 and a concave image-side surface 642. The fourth lens element 640 has inflection points formed on both the object-side surface 641 and the image-side surface 642 thereof. The object-side surface 641 and the image-side surface 642 of the fourth lens element 640 are aspheric.

The IR cut filter 660 and the cover glass 670 is located behind the fourth lens element 640 and will not affect the focal length of the photographing optical lens assembly.

The equation of the aspheric surface profiles of the above lens elements of the sixth embodiment is the same as that of the first embodiment, and will not be stated herein again.

In the photographing optical lens assembly according to the sixth embodiment, the definitions of f, Fno, and HFOV are the same as those stated in the first embodiment with corresponding values for the sixth embodiment, and they satisfy the following relationships:

$f=3.34$ mm;

Fno=2.86; and

HFOV=34.7 degrees.

In the photographing optical lens assembly according to the sixth embodiment, the definitions of all variables for conditions provided in the claims (V1, V2, CT3, T12, R1, R2, R3, R4, R5, R6, R7, R8, f2, f4, SL, TTL, and ImgH) are the same as those stated in the first embodiment with corresponding values for the sixth embodiment, and they satisfy the following relationships:

$V1-V2=32.7;$ $CT3/f=0.15;$ $T12/f=0.17;$ $|R1/R2|=0.08;$ $R5/R6=-0.31;$ $(R3+R4)/(R3-R4)=-2.63;$ $(R7+R8)/(R7-R8)=23.11;$ $f/f2=-1.14;$ $f/f4=0.16;$ $SL/TTL=0.99;$ and $TTL/ImgH=1.89.$ The detailed optical data of the sixth embodiment is shown in Table 11 and the aspheric surface data is shown in Table 12 as follows.

TABLE 11

6th Embodiment
f = 3.34 mm, Fno = 2.86, HFOV = 34.7 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.065 | | | | |
| 2 | Lens 1 | 1.68712 (ASP) | 0.418 | Plastic | 1.543 | 56.5 | 2.88 |
| 3 | | −19.97055 (ASP) | 0.579 | | | | |
| 4 | Lens 2 | −0.91082 (ASP) | 0.315 | Plastic | 1.634 | 23.8 | −2.93 |
| 5 | | −2.02641 (ASP) | 0.200 | | | | |
| 6 | Lens 3 | 3.39504 (ASP) | 0.510 | Plastic | 1.530 | 55.8 | 4.94 |
| 7 | | −10.80640 (ASP) | 0.285 | | | | |
| 8 | Lens 4 | 1.13570 (ASP) | 0.579 | Plastic | 1.530 | 55.8 | 21.01 |
| 9 | | 1.04151 (ASP) | 0.600 | | | | |
| 10 | IR-filter | Plano | 0.300 | Glass | 1.517 | 64.2 | — |
| 11 | | Plano | 0.090 | | | | |
| 12 | Cover-glass | Plano | 0.500 | Glass | 1.517 | 64.2 | — |
| 13 | | Plano | 0.127 | | | | |
| 14 | Image | Plano | — | | | | |

The reference wavelength (d-line) is 587.6 nm.

TABLE 12

Aspheric Coefficients

| | Surface # | | | |
|---|---|---|---|---|
| | 2 | 3 | 4 | 5 |
| k = | −1.39268E+00 | 5.04750E+02 | −4.38817E+00 | 9.47141E−01 |
| A4 = | −3.27156E−02 | −1.75829E−01 | −8.46393E−01 | −2.42659E−01 |
| A6 = | −2.49289E−01 | −1.08063E−01 | 2.06259E+00 | 9.24382E−01 |
| A8 = | 1.24939E+00 | −3.61736E−01 | −3.75142E+00 | −1.37414E+00 |
| A10 = | −5.52896E+00 | 1.97487E−01 | 5.73359E+00 | 1.83588E+00 |
| A12 = | 5.79063E+00 | −1.07211E+00 | −6.16974E+00 | −1.47635E+00 |
| A14 = | 5.84683E+00 | 3.09656E+00 | 5.14746E+00 | 6.18870E−01 |
| A16 = | −1.30278E+01 | −3.16889E+00 | −2.27570E+00 | −8.81877E−02 |

| | Surface # | | | |
|---|---|---|---|---|
| | 6 | 7 | 8 | 9 |
| k = | 4.79154E+00 | 4.25211E+01 | −1.73078E+00 | −2.07179E+00 |
| A4 = | −8.24446E−02 | −5.46251E−03 | −2.32876E−01 | −1.71353E−01 |
| A6 = | 1.21822E−01 | 5.03402E−02 | 1.23689E−01 | 7.57171E−02 |
| A8 = | −1.48694E−01 | −4.71284E−02 | −5.80937E−02 | −2.45796E−02 |
| A10 = | 6.28248E−02 | 9.08434E−03 | 1.84037E−02 | 3.10244E−03 |
| A12 = | 1.86824E−03 | 2.34276E−03 | −2.78402E−03 | 6.76002E−04 |
| A14 = | −1.01496E−02 | −7.07513E−04 | 1.42408E−04 | −2.46936E−04 |
| A16 = | 1.94070E−03 | −9.60868E−05 | 8.75044E−07 | 2.30363E−05 |

Table 13 is the data of the respective embodiments resulting from the aforementioned equations.

TABLE 13

|  | 1st Embodiment | 2nd Embodiment | 3rd Embodiment | 4th Embodiment | 5th Embodiment | 6th Embodiment |
|---|---|---|---|---|---|---|
| f | 3.30 | 3.06 | 3.08 | 4.88 | 3.11 | 3.34 |
| Fno | 2.85 | 3.00 | 2.85 | 3.50 | 2.80 | 2.86 |
| HFOV | 34.0 | 36.2 | 36.0 | 31.0 | 35.8 | 34.7 |
| V1 − V2 | 32.4 | 34.5 | 32.4 | 13.9 | 34.4 | 32.7 |
| CT3/f | 0.22 | 0.25 | 0.22 | 0.18 | 0.25 | 0.15 |
| T12/f | 0.19 | 0.20 | 0.19 | 0.06 | 0.18 | 0.17 |
| |R1/R2| | 0.03 | 0.08 | 0.09 | 0.57 | 0.04 | 0.08 |
| R5/R6 | −1.20 | −1.71 | −1.70 | −2.48 | −1.67 | −0.31 |
| (R3 + R4)/(R3 − R4) | −3.01 | −2.89 | −2.43 | 0.04 | −2.88 | −2.63 |
| (R7 + R8)/(R7 − R8) | 7.06 | 5.49 | 8.13 | 75.07 | 5.35 | 23.11 |
| f/f2 | −1.02 | −0.98 | −1.15 | −1.40 | −1.00 | −1.14 |
| f/f4 | −0.29 | −0.41 | −0.17 | 0.15 | −0.43 | 0.16 |
| SL/TTL | 0.98 | 0.88 | 0.99 | 0.87 | 0.98 | 0.99 |
| TTL/ImgH | 1.83 | 1.81 | 1.78 | 2.19 | 1.82 | 1.89 |

According to the aforementioned embodiments of the present invention, the track length and the sensitivity of the photographing optical lens assembly can be effectively reduced while retaining high image quality.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A photographing optical lens assembly comprising, in order from an object side to an image side:
    a first lens element with positive refractive power having a convex object-side surface;
    a second lens element with negative refractive power having a concave object-side surface and a convex image-side surface;
    a third lens element with positive refractive power having a convex object-side surface and a convex image-side surface; and
    a fourth lens element having a convex object-side surface and a concave image-side surface, wherein the object-side surface and the image-side surface of the fourth lens element are aspheric;
    wherein a radius of curvature of the object-side surface of the second lens element is R3, a radius of curvature of the image-side surface of the second lens element is R4, a radius of curvature of the object-side surface of the first lens element is R1, and a radius of curvature of the image-side surface of the first lens element is R2; the photographing optical lens assembly further comprises an aperture stop, wherein a distance on the optical axis between the aperture stop and the image plane is SL, a distance on the optical axis between the object-side surface of the first lens element and the image plane is TTL, and they satisfy the following relationships:

$-5.0<(R3+R4)/(R3-R4)<-2.0$;

$|R1/R2|<0.5$; and $0.80<SL/TTL<1.20$.

2. The photographing optical lens assembly of claim 1, wherein the fourth lens element is made of plastic material and has at least one inflection point on at least one of the object-side surface and the image-side surface thereof.

3. The photographing optical lens assembly of claim 2, wherein the fourth lens element has negative refractive power.

4. The photographing optical lens assembly of claim 3, wherein a distance on the optical axis between the first lens element and the second lens element is T12, the focal length of the photographing optical lens assembly is f, and they satisfy the following relationship:

$0.13<T12/f<0.27$.

5. The photographing optical lens assembly of claim 4, wherein the radius of curvature of the object-side surface of the second lens element is R3, and a radius of curvature of the image-side surface of the second lens element is R4, and they satisfy the following relationship:

$-3.5<(R3+R4)/(R3-R4)<-2.3$.

6. The photographing optical lens assembly of claim 4, wherein the distance on the optical axis between the aperture stop and the image plane is SL, the distance on the optical axis between the object-side surface of the first lens element and the image plane is TTL, and they satisfy the following relationship:

$0.92<SL/TTL<1.10$.

7. The photographing optical lens assembly of claim 6, wherein a radius of curvature of the object-side surface of the third lens element is R5, a radius of curvature of the image-side surface of the third lens element is R6, and they satisfy the following relationship:

$-2.7<R5/R6<-0.9$.

8. The photographing optical lens assembly of claim 6, wherein the Abbe number of the first lens element is V1, the Abbe number of the second lens element is V2, and they satisfy the following relationship:

$28.0<V1-V2<42.0$.

9. The photographing optical lens assembly of claim 8, wherein a radius of curvature of the object-side surface of the fourth lens element is R7, a radius of curvature of the image-side surface of the fourth lens element is R8, and they satisfy the following relationship:

$3.0<(R7+R8)/(R7-R8)<25.0$.

10. The photographing optical lens assembly of claim 6, wherein a focal length of the photographing optical lens assembly is f, a focal length of the fourth lens element is f4, and they satisfy the following relationship:

$-0.7<f/f4<0.0$.

11. The photographing optical lens assembly of claim 10, wherein the radius of curvature of the object-side surface of the first lens element is R1, the radius of curvature of the image-side surface of the first lens element is R2, and they satisfy the following relationship:

|R1/R2|<0.2.

12. The photographing optical lens assembly of claim 5, wherein a thickness on the optical axis of the third lens element is CT3, the focal length of the photographing optical lens assembly is f, and they satisfy the following relationship:

0.07<CT3/f<0.28.

13. The photographing optical lens assembly of claim 4, wherein the focal length of the photographing optical lens assembly is f, a focal length of the second lens element is f2, and they satisfy the following relationship:

−1.3<f/f2<−0.9.

14. The photographing optical lens assembly of claim 1, further comprising,
an image sensing unit located on the image plane, wherein a half of a diagonal length of an effective pixel area of the image sensing unit is ImgH, and the distance on the optical axis between the object-side surface of the first lens element and the image plane is TTL, and they satisfy the following relationship:

TTL/ImgH<1.95.

15. A photographing optical lens assembly comprising, in order from an object side to an image side:
a first lens element with positive refractive power having a convex object-side surface;
a second lens element with negative refractive power having a concave object-side surface;
a third lens element with positive refractive power having a convex object-side surface and a convex image-side surface;
a fourth lens element having a concave image-side surface, and at least one inflection point on at least one of an object-side surface and the image-side surface thereof;
wherein a radius of curvature of the object-side surface of the third lens element is R5, a radius of curvature of the image-side surface of the third lens element is R6, a distance on the optical axis between the first lens element and the second lens element is T12, a focal length of the photographing optical lens assembly is f, a thickness on the optical axis of the third lens element is CT3; the photographing optical lens assembly further comprises an aperture stop, wherein a distance on the optical axis between the aperture stop and the image plane is SL, a distance on the optical axis between the object-side surface of the first lens element and the image plane is TTL, and they satisfy the following relationships:

−2.7<R5/R6<−0.9;

0.13<T12/f<0.27;

0.07<CT3/f<0.28; and 0.92<SL/TTL<1.10.

16. The photographing optical lens assembly of claim 15, wherein at least one surface of the third lens element is aspheric, and the fourth lens element is made of plastic material.

17. The photographing optical lens assembly of claim 16, wherein the second lens element has a convex image-side surface.

18. The photographing optical lens assembly of claim 17, wherein the fourth lens element has a convex object-side surface, the focal length of the photographing optical lens assembly is f, a focal length of the fourth lens element is f4, and they satisfy the following relationship:

−0.7<f/f4<0.0.

19. The photographing optical lens assembly of claim 18, wherein a radius of curvature of the object-side surface of the first lens element is R1, a radius of curvature of the image-side surface of the first lens element is R2, and they satisfy the following relationship:

|R1/R2|<0.2.

20. The photographing optical lens assembly of claim 17, wherein a radius of curvature of the object-side surface of the second lens element is R3, a radius of curvature of the image-side surface of the second lens element is R4, and they satisfy the following relationship:

−5.0<(R3+R4)/(R3−R4)<−2.0.

21. The photographing optical lens assembly of claim 17, wherein the focal length of the photographing optical lens assembly is f, a focal length of the second lens element is f2, and they satisfy the following relationship:

−1.3<f/f2<−0.9.

22. The photographing optical lens assembly of claim 16, further comprising,
an image sensing unit located on the image plane, wherein a half of a diagonal length of an effective pixel area of the image sensing unit is ImgH, the distance on the optical axis between the object-side surface of the first lens element and the image plane is TTL, and they satisfy the following relationship:

TTL/ImgH<1.95.

* * * * *